United States Patent [19]
Hiltunen et al.

[11] Patent Number: 5,626,088
[45] Date of Patent: May 6, 1997

[54] METHOD AND APPARATUS FOR UTILIZING BIOFUEL OR WASTE MATERIAL IN ENERGY PRODUCTION

[75] Inventors: Matti A. Hiltunen, Karhula; Jorma J. Nieminen, Varkaus, both of Finland

[73] Assignee: Foster Wheeler Energia OY, Helsinki, Finland

[21] Appl. No.: 563,844

[22] Filed: Nov. 28, 1995

[51] Int. Cl.$^6$ ..................................................... F23G 7/00
[52] U.S. Cl. ........................... 110/243; 110/245; 110/345; 122/4 D; 165/104.16
[58] Field of Search ..................................... 110/234, 245, 110/345, 346, 347, 348, 243, 244; 122/4 D; 165/104.16

[56] References Cited

U.S. PATENT DOCUMENTS

| | | | |
|---|---|---|---|
| 4,676,177 | 6/1987 | Engstrom | 110/345 |
| 4,934,285 | 6/1990 | Jormanainen et al. | 110/346 |
| 5,154,128 | 10/1992 | Scholl et al. | 110/341 |
| 5,345,884 | 9/1994 | Vandycke et al. | 110/345 |
| 5,385,104 | 1/1995 | Binner | 110/246 |
| 5,425,850 | 6/1995 | Tanca et al. | 162/31 |

FOREIGN PATENT DOCUMENTS

| | | |
|---|---|---|
| 168245 | 2/1994 | Denmark . |
| 1895/73 | 6/1973 | Finland . |
| 851338 | 1/1987 | Finland . |
| 86471 | 5/1992 | Finland . |
| 3632534 | 4/1987 | Germany . |
| 9012986 | 11/1990 | WIPO . |

Primary Examiner—John M. Sollecito
Assistant Examiner—Pamela A. O'Connor
Attorney, Agent, or Firm—Charles L. Willis

[57] ABSTRACT

Method and apparatus for using biofuel or waste material or both for energy production. The biofuel or the waste material is gasified in a fluidized bed gasifier (10), preferably a circulating fluidized bed gasifier. The gas produced in the gasifier is introduced into a boiler (12) equipped with fossil fuel burners (28, 28'28"), typically burners for pulverized coal. The gas is introduced at a level above the burners. Ash from the boiler may be used to form the bed of the gasifier. For control of NO$_x$, the gas is burned in the upper part of the boiler at a low temperature level of 800°–1050° C. (1472°–1922° F.), preferably 850°–900° C. (1562°–1652° F.), and with a small excess air content of about 5–10 percent. In a second embodiment, the raw gas may be cleaned of harmful or noxious components, and cooled if desired, between the gasifier and the boiler in an additional circulating fluidized bed reactor (152) having a bed of coal ash.

23 Claims, 2 Drawing Sheets

METHOD AND APPARATUS FOR UTILIZING BIOFUEL OR WASTE MATERIAL IN ENERGY PRODUCTION

BACKGROUND OF THE INVENTION

The present invention relates to a method and apparatus for utilizing biofuel or waste material in energy production.

Many methods have been suggested for utilizing cheap biofuel or waste material for energy production in order to compensate for a portion of fossil fuel used in energy production and to thereby decrease $CO_2$ emissions generally in energy production. In most cases, waste material has to be disposed of in one way or another anyhow.

Biofuel, and especially waste material, being a low energy fuel and often including harmful and noxious components, is not easily utilized for energy production. Noxious components, such as heavy metal compounds, may cause environmentally dangerous emissions, whereas alkali compounds tend to cause technical problems, especially when burning such material.

The low energy content of biofuel and waste material render them generally inadequate for high efficiency production of energy, such as high temperature, high pressure steam or electricity. Also, uneven delivery of waste material, differences in its quality and other similar hard-to-control variations, may cause problems in energy production that relies solely on waste-material-based fuel. The waste material per se is often delivered in a state unsuitable for direct introduction into a steam boiler. The material has to be dried, crushed, pelletized or otherwise handled before it is fed into the boiler. Therefore there have been suggested different ways of combining gasifiers with combustors.

Biofuel and waste material can, however, rather easily be gasified. But the utilization of biofuel and waste material for the production of energy presupposes a complete gasification plant, with gasifier and gas cleaners, and a complete power plant, with boiler, turbines, etc. Such is not economically feasible to provide when only small amounts of biofuel or waste material are available.

It has been suggested in Finnish patent application FI 1895/73 to gasify biofuel on a grid and introduce the gas produced in the gasifier into a coal or oil fired boiler to be burned therein. The gas is introduced into the boiler together with the oil or coal through special oil or coal burners.

It has been suggested in another Finnish patent application FI 851338 that waste wood or similar low energy fuel be gasified and the gas thus produced be burned in a multi-fuel combustor. Additional pulverized combustible material is injected directly into the gas burning flame.

It has further been suggested in WO publication 90/12986 to dry waste material in direct heat exchange with hot exhaust gases from a coal-burning plant and feeding both the gas mixture produced through drying and the dry solid material produced from the waste into the coal burning plant. The gas is introduced into the bottom of the coal burning reactor below coal burners therein. Dried material is also fed into the reactor at a higher level.

It has also already been suggested in DE 36 32 534 to gasify fuel which contains alkali compounds in a fluidized bed gasifier at a temperature below 900° C. (1652° F.) and to burn the gas produced in the gasifier in a combustor at a temperature level high enough (>900° C.) to melt alkali contents in the flue gas. The alkali compounds can be separated in a molten state, and the cleaned gas can be cooled in a convection section of a boiler.

All the above suggested processes seem to presuppose that the combustor, boiler or burners therein are constructed especially for that special process, for continuously burning biofuel or waste derived product gas. Some of the designs seem to be rather complicated.

SUMMARY OF THE INVENTION

It is therefore an object of the present invention to provide an improved method and apparatus for utilizing biofuel or waste material in energy production.

It is also an object of the present invention to provide a method and an apparatus for utilizing biofuel or waste material for high efficiency production of steam and/or electricity.

It is further an object of the present invention to provide a method and an apparatus for utilizing a burner-equipped boiler in energy production for the burning of biofuel or waste material.

It is still further an object of the present invention to provide a method and an apparatus for utilizing biofuel and waste material in energy production with minimized emissions of harmful or noxious compounds.

In accordance with the present invention, there is provided an improved method and apparatus for utilizing biofuel or waste material for energy production, by gasifying said biofuel or waste material and burning gas produced in the gasifier in a steam boiler.

The most basic concept behind the present invention is the utilization of 1) a fluidized bed gasifier, for gasification of biofuel or waste material, and 2) a conventional burner-equipped fossil-fuel-fired boiler, typically having pulverized coal or oil burners in the lower part thereof, for burning pulverized coal or oil, and means disposed at a level above the pulverized coal or oil burners for burning gas produced in the gasifier.

Typically the boiler will be equipped with pulverized coal burners. In other cases, the burners could be oil burners or even natural gas burners. The boiler will be of a type in which biofuel or waste material cannot normally be burned. Therefore, it will not be a fluidized bed boiler. Because pulverized coal and oil are the most typical fuels used in the burners, the remainder of this specification sometimes refers to coal or oil burners. Howevers, it will be understood that such references are sufficiently broad to include fossil-fuel-fired burners generally.

Biofuel or waste material is gasified in the fluidized bed gasifier with a bed of e.g. coal ash that has been separated from boiler flue gases or other solid particulate material. The hot raw gas produced in the gasifier may be fed directly into a pulverized coal fired boiler or, preferably, the gas may first be cleaned in order to separate alkali and heavy metal contents therefrom.

The produced gas is fed into the boiler at a level above the main burners, e.g. the pulverized coal or oil burners therein. The burning of gas thereby forms a re-burning stage in the boiler, which decreases $NO_x$ content in the boiler flue gases.

According to a preferred embodiment of the present invention there is thereby provided a method and apparatus that allow utilization of biofuel or waste material for high efficiency energy production, i.e. production of high temperature and high pressure steam and electricity, in a conventional pulverized coal-fired boiler.

Large pulverized coal fired boilers usually are of the flow-through type having reheater sections within the boiler and very high efficiency electricity production. According to one important aspect of the present invention, electricity can be produced at high efficiency also from biofuel or waste material, when the material is first gasified and then burned in a mainly conventional high efficiency boiler.

The present invention provides means for replacing a portion of the pulverized coal or oil burned in a boiler with gas derived from cheaper fuel material, such as biofuel or waste material. The energy provided by the gas may correspond to 5–35 percent of the total energy production. In smaller boilers, this percentage may be even greater. This replacement of fossil coal or oil with regenerative fuel decreases $CO_2$ emissions correspondingly in a global perspective.

A pulverized coal-fired boiler having gas burners installed therein, as suggested in the present invention, can in most applications also be used for solely burning pulverized coal, if needed. No such fundamental changes have normally to be made to the boiler, that would make it impossible to use the boiler in a conventional manner. The present invention only provides means for utilizing the boiler when desired, continuously or intermittently, for multi-fuel energy production.

An existing power plant utilizing the present invention mainly needs the addition to the existing equipment of a gasifier, possibly gas cleaning and cooling means, and means for transporting gas and ash. In contrast, a process where energy is to be produced solely from biofuel or waste material requires that both a gasification plant and a separate complete boiler plant be built. Even for relatively small boiler plants, such leads to very costly investments.

The efficiency of such small boiler plants is usually considerably less than the efficiency of larger coal-fired boiler plants. Neither would it be economically feasible to transport waste material long distances in order to justify larger boilers relying only on waste material.

Many different fuels may be gasified in a gasifier, and the gasification process can be controlled by controlling the substoichiometric amount of air introduced into the gasifier. This makes it possible to e.g. use a variety of different more-or-less wet biofuels or waste materials. The moisture content may vary between 70–0 percent. When using extremely wet material, over-stoichiometric amounts of air may have to be used. This of course leads to a decrease in efficiency.

Waste material as such is normally easily gasified. The material does not have to be pulverized but can be introduced into the gasifier in a rather untreated state. Gasification in a fluidized bed, especially in a circulating fluidized bed, is advantageous. Gasification would normally take place at a temperature of 600°–1100° C. (1112°–2012° F.), preferably 750°–950° C. (1382°–1742° F.). Gasification at rather low temperatures leads to fewer problems with depositions of molten ash and other sticky compounds than when combusting waste material at high temperatures.

According to a further embodiment of the present invention, flue gas emissions may be minimized by separating alkali components, heavy metal components, such as Pb, Zn, As, and possibly other harmful or noxious components from the product gas before leading the gas into the boiler. The cleaning of the gas can advantageously take place in a circulating fluidized bed reactor, where the gas is cooled to about 400°–600° C. (752°–1112° F.). The gas should not be cooled to too low a temperature, where tars or other similar components, which otherwise can be burned in their gaseous states, may condense and be separated from the product gas and cause problems, instead of being introduced into the boiler.

A further advantage achieved by the present invention is the low total excess air content needed in the boiler. Burning of gas arranged to take place in the upper part of the boiler needs a very low excess air content of about 5–10 percent, compared to the excess air of about 15–20 percent needed when burning pulverized coal in the lower part of the boiler. Residual oxygen in the gas burning zone is about 1–2.5 percent and in the coal burning zone about 3–5 percent. The minimum excess air and the burning of gas at the relatively low temperature of 800°–1050° C. (1472°–1922° F.), preferably 850°– 900° C. (1562°–1652° F.), leads to minimal $NO_x$ formation in the boiler.

The present invention by providing this re-burning stage, i.e. gas burning stage, in the upper part of the boiler also decreases $NO_x$ emissions derived from the pulverized coal burning. Gas produced in a gasifier always contains some $NH_3$. When combusting such product gas well above the coal burners in the boiler, then $NH_3$, introduced with the gas into the upper part of the boiler, will react with $NO_x$ components coming from pulverized coal firing. Reactions between $NH_3$ and $NO_x$ form harmless $N_2$ and $H_2O$. These reactions are favored by the product gas being burned at a low temperature and at low excess air content. Strongly staged combustion of gas, i.e. introducing air at a level substantially above the gas injecting level, also favors these reactions. Staged combustion provides sub-stoichiometric conditions at which $NH_3/NO_x$ reactions are favored.

Ash separated from boiler flue gases can, according to a preferred embodiment of the present invention, be used as bed material in the fluidized bed gasifier. Thereby the carbon content of boiler ash is at least partly recovered and gasified in the gasifier or possibly recirculated with product gas into the boiler.

Thermal losses are decreased if the raw uncleaned and uncooled product gas is directly fed into the boiler, as thereby non-gasified carbon fines, derived from waste material or possibly from coal ash, also are injected into the boiler and burned therein. In a boiler with very strongly staged burning of coal the amount of residual coal material in the flyash may reach a level as high as about 5–15 percent.

Thermal losses are of course also decreased by the present invention, as combustion of gas takes place at very low total excess air. One of the main advantages of the present invention is that solid biofuel or waste material can be utilized in energy production in connection with conventional pulverized coal or oil fired boilers, i.e. utilized for very high efficiency energy production.

BRIEF DESCRIPTION OF THE DRAWINGS

The present invention is explained below in more detail by reference to illustrative embodiments represented in the drawings in which.

DESCRIPTION OF THE PREFERRED EMBODIMENTS

Figure 1:
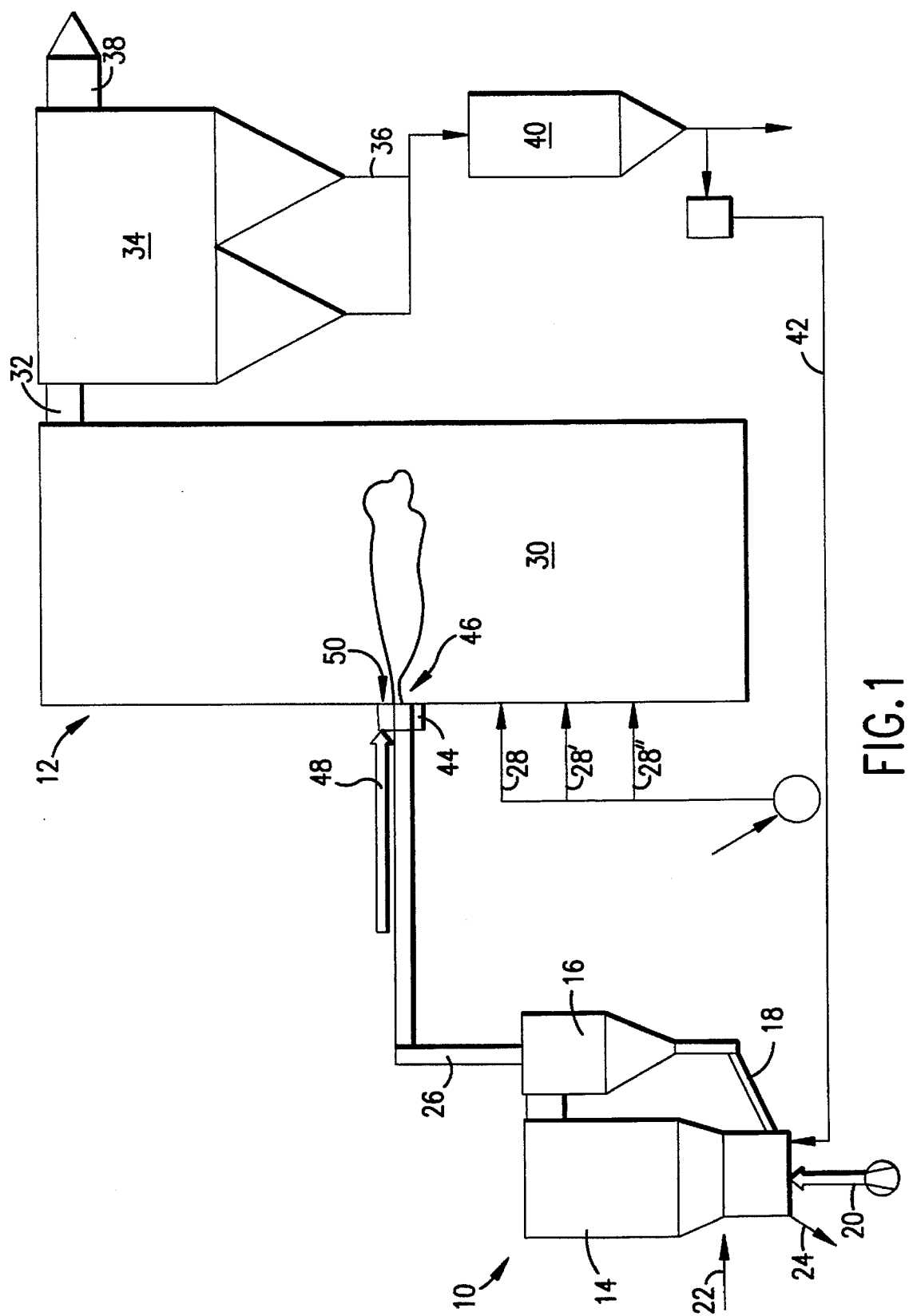
FIG. 1 is a schematic drawing of a gasifier/boiler system according to the present invention.

FIG. 1 illustrates a gasifier 10 for the gasification of biofuel and/or waste material, and a pulverized coal fired boiler 12 connected by thereto, for burning pulverized coal or oil and the product gas produced in the gasifier. The gasifier 10 is a circulating fluidized bed (CFB) gasifier with a circulating bed of solid particles therein.

The CFB gasifier includes a gasification chamber 14, a particle separator 16 connected to the upper or gas discharge end of the chamber 14, and a return duct 18 connecting the lower end of the separator 16 with the lower end of the gasification chamber 14. A bed of solid particles is fluidized in the gasifier by fluidizing gas, such as air, introduced through a duct 20 through the bottom of the gasification chamber 14. Biofuel and/or waste material is introduced into the gasification chamber through duct 22 and instantly mixed into the hot fluidized bed therein. The biofuel or waste material may be non-pulverized and non-dried. Bed material including bottom ash, coarse solid material etc., may be discharged from the bottom of the gasification chamber through bottom ash discharge duct 24. Product gas is discharged from the separator 16 through duct 26. The bed material circulating through the chamber 14, separator 16 and return duct 18 provides an even temperature throughout the gasifier and favorable conditions for gasification.

The boiler 12 is a flow-through boiler with staged pulverized coal burners 28, 28' and 28" feeding coal and air at three levels to three different coal firing zones in the lower part 30 of the boiler. Flue gases are discharged from the top of the boiler through duct 32 into a convection section 34. Fine ash is separated from the flue gases and discharged through ducts 36. Flue gas is discharged through duct 38. Ash separated from flue gases may be further treated in a device 40. Fine carbon-containing ash is led from the device 40 through duct 42 into the gasification chamber 14 for forming circulating fluidized bed material therein.

Hot raw product gas being produced in the gasifier 10 and being discharged through duct 26 is led through an injector 44 into the boiler 12 at a level 46 above the coal burners 28, 28' and 28". Air for burning product gas is introduced through a nozzle or nozzles 48 at a level 50 above the level 46 of the gas injector 44 in order to achieve staged combustion of product gas in the boiler.

Residual air contained in the flue gases rising from the coal firing zones is used for burning product gas at its inlet level 46. Sub-stoichiometric conditions prevail at the gas inlet level 46, whereby $NH_3$ in the product gas will react with $NO_x$ in the flue gases to form harmless $N_2$ and $H_2O$. Product gas is thereafter completely burned with air introduced through nozzles 48 at the higher level 50. The gas is here burned at a relatively low temperature, preferably 850°–900° C. (1562°–1652° F.), at which $NO_x$ formation from nitrogen in air is much less than in the combustion process in the lower part of the boiler, where carbonaceous fuel is burned at high temperatures, typically over 1000° C. (1832° F.).

Figure 2:
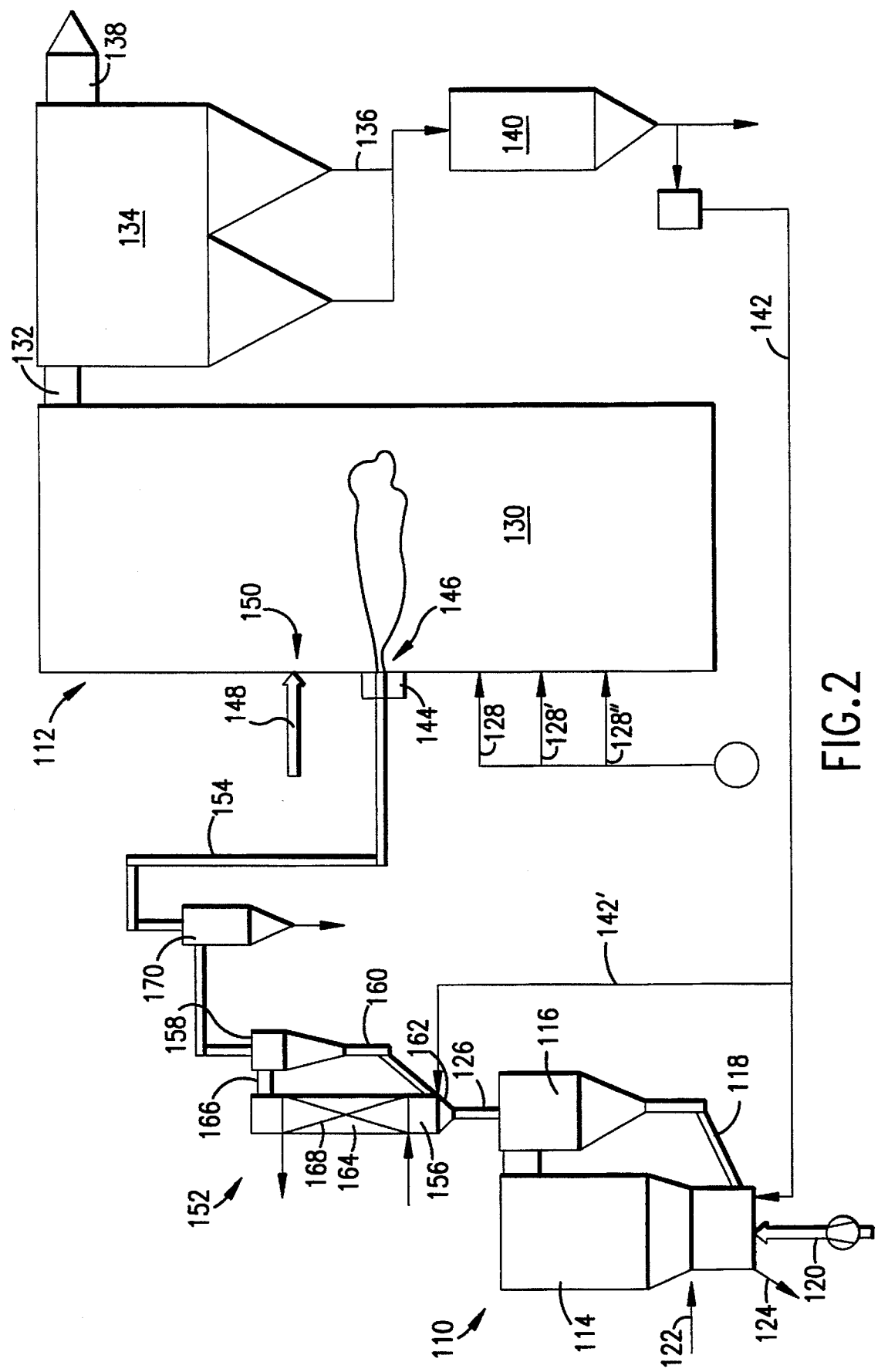
FIG. 2 is a schematic drawing of another gasifier/boiler system according to the present invention.

FIG. 2 illustrates another system, similar to that of FIG. 1. The system in FIG. 2 differs from the one in FIG. 1 in the treatment of raw product gas before its introduction into the boiler. The same reference numbers, preceded by a number "1," are used in FIG. 2, where applicable.

FIG. 2 shows a CFB gasifier 110, with gasification chamber 114, separator 116, return duct 118, product gas discharge duct 126, and a boiler 112, with staged coal burners 128, 128' and 128", gas injector 144 and air nozzle or nozzles 148.

Product gas discharged through the duct 126 from the CFB gasifier 110 is cleaned and cooled in a CFB cooler 152 before being led through a duct 154 and into the boiler 112 via the gas injector 144.

The CFB gas cooler includes a circulating fluidized bed reactor comprising a reactor chamber 156, separator 158 and return duct 160. Hot and unclean raw product gas is introduced as fluidizing gas through the bottom 162 of the reactor chamber 156. The lowermost part of the reactor chamber forms a mixing chamber for mixing hot product gas vigorously with particles recirculated into the mixing chamber portion of the reactor chamber 156 through return duct 160. The mixing of product gas into a bed of cooled particles very efficiently cools the gas. The bed material in the CFB cooler may be formed of ash particles introduced from the boiler through ducts 142 and 142'.

The product gas flow introduced through duct 126 into the reactor chamber 156 transports solid bed particles upward through a riser portion 164 thereof towards a discharge duct 166 connected to the uppermost part of the reactor chamber. Heat transfer surfaces 168 disposed in the riser portion of the reactor chamber above the mixing chamber portion thereof further cool the suspension of product gas and solid bed material flowing upward through the riser portion of the reactor chamber.

Cooling of gas causes certain previously-vaporized harmful constituents, such as alkali and heavy metal compounds, to solidify onto bed material particles and become easy to separate from the product gas in the separator 158. Also, sticky constituents in raw gas fasten onto bed material and are easily separated from the gas.

Most particles are separated from the cooled and cleaned product gas in the separator 158. The gas may however, as shown in FIG. 2, be cleaned in still another cyclone 170, which separates residual fine particulate material, such as fly ash and alkalies, from the gas before introducing the cleaned gas through gas injector 144 into the boiler 112.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A method of utilizing biofuel or waste material or both for energy production comprising the steps of:

introducing said biofuel or waste material or both into a fluidized bed gasifier;

operating said fluidized bed gasifier so as to gasify said biofuel or waste material therein and produce a raw gas;

introducing said raw gas into a steam-generating boiler equipped with fossil fuel burners, said introducing step occurring at a level in said boiler that is above the level of said burners; and burning said raw gas at an elevated level in said boiler.

2. A method according to claim 1, comprising the further steps of:

separating ash from flue gases that have been discharged from said boiler;

introducing said separated ash into said fluidized bed gasifier; and using said separated ash in said gasifier to provide a fluidized bed of solid particles therein.

3. A method according to claim 2, comprising the further steps of:

passing effluent from said fluidized bed gasifier to a separator;

separating particulate material from gases in said separator;

passing said separated gases to said boiler as said raw gas; and returning said separated particulate material to said gasifier.

4. A method according to claim 1, comprising the further steps of:
  passing effluent from said fluidized bed gasifier to a separator;
  separating particulate material from gases in said separator;
  passing said separated gases to said boiler as said raw gas; and
  returning said separated particulate material to said gasifier.

5. A method according to claim 1, comprising the further step of cleaning said raw gas by removing alkalies or metal components or both from said raw gas before said raw gas is introduced into said boiler.

6. A method according to claim 5, comprising the step of condensing vaporized harmful or noxious components from said raw gas before said raw gas is introduced into said boiler.

7. A method according to claim 6, wherein said condensing step includes the step of passing said raw gas through a circulating fluidized bed reactor having a bed of coal ash after said raw gas exits said gasifier and before said raw gas is introduced into said boiler.

8. A method according to claim 5, wherein said cleaning step includes the step of passing said raw gas through a circulating fluidized bed reactor having a bed of coal ash after said raw gas exits said gasifier and before said raw gas is introduced into said boiler.

9. A method according to claim 1, wherein said step of burning said raw gas in said boiler comprises the step of carrying out said burning at a temperature of 800°–1050° C. (1472°–1922° F.).

10. A method according to claim 1, wherein said step of burning said raw gas in said boiler comprises the step burning an amount of said gas to provide between 5 and 35 percent of the total energy production of the boiler.

11. A method according to claim 1, wherein said step of burning said raw gas in said boiler comprises the step of carrying out said burning at a temperature of 850°–900° C. (1562°–1652° F.) and with excess air content of about 5–10 percent, thereby providing advantageous re-burning conditions of flue gases rising upward from the firing zone in the lower part of the boiler.

12. A method according to claim 1, wherein said step of introducing said biofuel or waste material or both into a fluidized bed gasifier comprises the step of introducing mainly non-pulverized and non-dried biofuel or waste material or both into said fluidized bed gasifier.

13. Apparatus for utilizing biofuel or waste material or both for energy production comprising:
  a fluidized bed gasifier for gasifying biofuel or waste material or both;
  a steam-generating boiler equipped with fossil fuel burners in a lower part thereof;
  means for transporting gas produced in said gasifier to said boiler; and
  means disposed at a level of said boiler above the level of said burners for introducing said gas into said boiler.

14. Apparatus according to claim 13, comprising means for discharging ash from said boiler and means for introducing said discharged ash into said gasifier for providing a bed of solid particles therein.

15. Apparatus according to claim 13, wherein said gasifier is a circulating fluidized bed gasifier.

16. Apparatus according to claim 13, further comprising a gas cleaning means connected to said gasifier and to said boiler, said gas cleaning means receiving gas produced in the gasifier and cleaning same before said gas is introduced into said boiler.

17. Apparatus according to claim 16, wherein said gas cleaning means comprises a circulating fluidized bed reactor.

18. Apparatus according to claim 16, wherein said gas cleaning means comprises a circulating fluidized bed reactor having a circulating bed of coal ash therein.

19. Apparatus according to claim 16, further comprising a particle separator connected to said gas cleaning means downstream thereof and also connected to said boiler, said particle separator comprising means for separating fine solid components from said gas before said gas is introduced into said boiler.

20. Apparatus according to claim 13, further comprising gas cooling means connected to said gasifier and to said boiler, said gas cooling means receiving gas produced in the gasifier and cooling same before said gas is introduced into said boiler.

21. Apparatus according to claim 20, wherein said gas cooling means comprises a circulating fluidized bed cooler.

22. Apparatus according to claim 20, wherein said gas cooling means comprises a circulating fluidized bed cooler having a circulating bed of coal ash therein.

23. Apparatus according to claim 20, further comprising a particle separator connected to said gas cooling means downstream thereof and also connected to said boiler, said particle separator comprising means for separating fine solid components from said gas before said gas is introduced into said boiler.

* * * * *